United States Patent
Choi

(10) Patent No.: US 10,830,143 B2
(45) Date of Patent: Nov. 10, 2020

(54) COOLING PATH STRUCTURE FOR CONCENTRATED COOLING OF SEAL AREA AND GAS TURBINE COMBUSTOR HAVING THE SAME

(71) Applicant: DOOSAN HEAVY INDUSTRIES & CONSTRUCTION CO., LTD., Changwon-si, Gyeongsangnam-do (KR)

(72) Inventor: In Chan Choi, Gwangyang-si (KR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 128 days.

(21) Appl. No.: 16/026,065

(22) Filed: Jul. 3, 2018

(65) Prior Publication Data
US 2019/0063320 A1 Feb. 28, 2019

(30) Foreign Application Priority Data
Aug. 22, 2017 (KR) .......................... 10-2017-0106058

(51) Int. Cl.
*F02C 7/12* (2006.01)
*F01D 9/02* (2006.01)
(Continued)

(52) U.S. Cl.
CPC .............. *F02C 7/12* (2013.01); *F01D 9/023* (2013.01); *F01D 25/12* (2013.01); *F02C 7/28* (2013.01);
(Continued)

(58) Field of Classification Search
CPC .. F01D 9/023; F01D 25/12; F23R 3/04; F23R 3/06; F23R 2900/03044;
(Continued)

(56) References Cited

U.S. PATENT DOCUMENTS 3,581,492 A * 6/1971 Norgren ............... F23R 3/06
60/804
4,192,138 A * 3/1980 Szema ............... F23R 3/045
431/351
(Continued)

FOREIGN PATENT DOCUMENTS

EP 2141329 A2 1/2010
EP 2204615 A2 7/2010
(Continued)

OTHER PUBLICATIONS

An European Search Report dated Dec. 14, 2018 in connection with European Patent Application No. 18181893.1 which corresponds to the above-referenced U.S. application.
(Continued)

*Primary Examiner* — Alain Chau
(74) *Attorney, Agent, or Firm* — Invenstone Patent, LLC

(57) ABSTRACT

A cooling path structure for concentrated cooling of a seal area in a duct assembly and a gas turbine combustor having the same are provided. The cooling path structure includes a concentrated cooling guide plate facing the seal area to introduce compressed cooling air into the seal area through a plurality of first cooling holes and a plurality of second cooling holes respectively formed in the guide plate. The first cooling holes are formed along a first inlet axis such that the introduced cooling air approaches a central axis of the seal area in a forward direction, and the second cooling holes are formed along a second inlet axis such that the introduced cooling air approaches the central axis of the seal area in a backward direction. The first and second inlet axes each are inclined at an acute angle relative to the central axis of the seal area.

13 Claims, 9 Drawing Sheets

(51) Int. Cl.
*F23R 3/00* (2006.01)
*F01D 25/12* (2006.01)
*F23R 3/04* (2006.01)
*F02C 7/28* (2006.01)
*F16J 15/02* (2006.01)

(52) U.S. Cl.
CPC .............. *F16J 15/022* (2013.01); *F23R 3/002* (2013.01); *F23R 3/045* (2013.01); *F05D 2240/35* (2013.01); *F05D 2240/55* (2013.01); *F05D 2260/201* (2013.01); *F05D 2260/202* (2013.01); *F05D 2260/38* (2013.01); *F23R 2900/00012* (2013.01); *F23R 2900/03044* (2013.01)

(58) Field of Classification Search
CPC ............ F23R 2900/00012; F23R 3/002; F23R 3/005; F23R 3/08; F23R 3/045; F02C 7/28; F02C 7/12; F02C 7/18; F05D 2240/55; F05D 2260/201; F05D 2260/202; F05D 2260/38; F16J 15/022; F23M 5/085
See application file for complete search history.

(56) References Cited

U.S. PATENT DOCUMENTS

| | | | | |
|---|---|---|---|---|
| 5,333,443 A * | 8/1994 | Halila | ............... | F23R 3/002 60/752 |
| 6,122,917 A * | 9/2000 | Senior | ............... | F23R 3/002 165/908 |
| 6,484,505 B1 | 11/2002 | Brown et al. | | |
| 6,494,044 B1 * | 12/2002 | Bland | ............... | F01D 9/023 60/772 |
| 7,010,921 B2 * | 3/2006 | Intile | ............... | F23R 3/002 60/752 |
| 7,096,668 B2 * | 8/2006 | Martling | ............... | F01D 9/023 60/754 |
| 8,166,764 B2 * | 5/2012 | Chokshi | ............... | F01D 5/186 60/758 |
| 8,276,391 B2 * | 10/2012 | Berry | ............... | F23R 3/002 60/782 |
| 8,281,600 B2 * | 10/2012 | Chen | ............... | F02C 7/18 60/772 |
| 8,291,711 B2 * | 10/2012 | Chokshi | ............... | F23R 3/06 60/758 |
| 8,307,657 B2 * | 11/2012 | Chila | ............... | F23R 3/06 60/757 |
| 8,544,277 B2 * | 10/2013 | Johnson | ............... | F23R 3/005 60/752 |
| 8,677,759 B2 * | 3/2014 | Kaleeswaran | ............... | F23R 3/005 60/752 |
| 8,794,006 B2 * | 8/2014 | Chokshi | ............... | F23R 3/06 60/752 |
| 8,813,501 B2 * | 8/2014 | Cihlar | ............... | F02C 7/22 60/752 |
| 8,955,331 B2 * | 2/2015 | Moehrle | ............... | F23R 3/002 60/752 |
| 9,046,269 B2 * | 6/2015 | Smith | ............... | F01D 5/186 |
| 9,127,551 B2 * | 9/2015 | Narcus | ............... | F01D 9/023 |
| 9,157,637 B2 * | 10/2015 | Poyyapakkam | ............... | F23R 3/002 |
| 9,995,221 B2 * | 6/2018 | Hughes | ............... | F02C 7/222 |
| 10,156,360 B2 * | 12/2018 | Lee | ............... | F23R 3/005 |
| 10,208,670 B2 * | 2/2019 | Gerendas | ............... | F23R 3/002 |
| 10,215,418 B2 * | 2/2019 | Metternich | ............... | F23R 3/002 |
| 2007/0227149 A1 * | 10/2007 | Biebel | ............... | F23R 3/06 60/752 |
| 2010/0000200 A1 * | 1/2010 | Smith | ............... | F01D 5/186 60/266 |
| 2010/0031666 A1 * | 2/2010 | Chokshi | ............... | F23R 3/08 60/760 |
| 2010/0170256 A1 * | 7/2010 | Kaleeswaran | ............... | F23R 3/005 60/754 |
| 2010/0215476 A1 | 8/2010 | Byrne | | |
| 2010/0223931 A1 * | 9/2010 | Chila | ............... | F23R 3/46 60/760 |
| 2010/0251723 A1 * | 10/2010 | Chen | ............... | F02C 7/18 60/760 |
| 2010/0269513 A1 * | 10/2010 | Berry | ............... | F23R 3/06 60/772 |
| 2011/0247339 A1 | 10/2011 | Chila et al. | | |
| 2011/0252805 A1 * | 10/2011 | Berry | ............... | F23R 3/002 60/772 |
| 2012/0047908 A1 * | 3/2012 | Poyyapakkam | ............... | F23R 3/002 60/774 |
| 2012/0167571 A1 * | 7/2012 | Cihlar | ............... | F01D 9/023 60/746 |
| 2012/0180500 A1 * | 7/2012 | DiCintio | ............... | F01D 9/023 60/796 |
| 2012/0247112 A1 * | 10/2012 | Narcus | ............... | F01D 9/023 60/759 |
| 2013/0086915 A1 * | 4/2013 | Cihlar | ............... | F23R 3/06 60/755 |
| 2016/0102864 A1 * | 4/2016 | Metternich | ............... | F23R 3/04 60/772 |
| 2017/0298824 A1 * | 10/2017 | Gerendas | ............... | F23R 3/002 |
| 2017/0363289 A1 * | 12/2017 | Shim | ............... | F23R 3/005 |

FOREIGN PATENT DOCUMENTS

| | | |
|---|---|---|
| EP | 2700877 A2 | 2/2014 |
| JP | 3590666 B2 | 11/2004 |
| JP | 2008-169840 A | 7/2008 |
| JP | 2010-159747 A | 7/2010 |
| JP | 2011-226481 A | 11/2011 |
| JP | 5679883 B2 | 1/2015 |
| JP | 5896644 B2 | 3/2016 |
| KR | 10-1766449 B1 | 8/2017 |

OTHER PUBLICATIONS

A Korean Office Action dated Nov. 28, 2018 in connection with Korean Patent Application No. 10-2017-0106058 which corresponds to the above-referenced U.S. application.

* cited by examiner

COOLING PATH STRUCTURE FOR CONCENTRATED COOLING OF SEAL AREA AND GAS TURBINE COMBUSTOR HAVING THE SAME

CROSS REFERENCE TO RELATED APPLICATIONS

This application claims the benefit of Korean Patent Application No. 10-2017-0106058, filed on Aug. 22, 2017, which is hereby incorporated by reference in its entirety into this application.

BACKGROUND OF THE INVENTION

Field of the Invention

The present invention relates generally to a gas turbine and, more particularly, to a cooling path structure for concentrated cooling of a seal area in a duct assembly provided to a combustion system for a gas turbine.

Description of the Related Art

Generally, a gas turbine combustor is provided between a compressor and a turbine so as to mix the compressed air from the compressor with fuel, combust the air-fuel mixture at constant pressure to produce combustion gases with high energy, and transmit the combustion gases to the turbine, which in turn converts heat energy of the combustion gases into mechanical energy.

Such combustors include a duct assembly which has a transition piece coming into direct contact with hot combustion gases, a flow sleeve surrounding the transition piece, and the like. Since the transition piece should be properly cooled, a portion of compressed air supplied from the compressor is directed towards an inner annular space of the flow sleeve through cooling holes of the flow sleeve to cool the transition piece.

However, a conventional cooling path structure of a duct assembly has a problem in that a seal area positioned at a rear end of a liner or a front end of the transition piece is not subjected to sufficient cooling by the compressed air flowing upstream through the cooling holes of the flow sleeve.

Furthermore, the conventional cooling path structure has an additional problem in that a portion of compressed air flows downstream along the inner annular space to offset an upstream flow of the compressed air, thereby degrading the efficiency of cooling the seal area.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and an object of the present invention is to provide a cooling path structure for concentrated cooling of a heat-sensitive seal area resiliently supporting a liner and a transition piece in a duct assembly of a gas turbine combustor.

Another object of the present invention is to provide a cooling path structure for concentrated cooling of a seal area of a duct assembly in a gas turbine combustor by minimizing obstructive factors such as a pressure drop, which interfere with an improvement of the efficiency of cooling the seal area.

In order to achieve the above objects, according to one aspect of the present invention, there is provided a cooling path structure for concentrated cooling of a seal area in a duct assembly of a gas turbine combustor, the duct assembly having a double-wall structure in which a flow sleeve surrounds a liner and a transition piece connected by means of a ring-type elastic support, and the seal area being in proximity to the elastic support and including rear and front sides of the liner and the transition piece. The cooling path structure may include a concentrated cooling guide plate facing the seal area to introduce compressed cooling air into the seal area through a plurality of first cooling holes and a plurality of second cooling holes respectively formed in the guide plate, wherein the first cooling holes are formed along a first inlet axis such that the introduced cooling air approaches a central axis of the seal area in a forward direction, and the second cooling holes are formed along a second inlet axis such that the introduced cooling air approaches the central axis of the seal area in a backward direction.

The first and second inlet axes may be symmetric relative to the central axis of the seal area.

The cooling path structure may further include a first cooling hole guide protruding from the guide plate proximate to the first cooling holes, and/or a second cooling hole guide protruding from the guide plate proximate to the second cooling holes. The second cooling hole guide may protrude higher than the first cooling hole guide.

The cooling path structure may further include a guide tube provided to the first cooling holes, the guide tube protruding through the guide plate and extending toward the seal area. The guide tube may have a decreasing inner diameter towards the central axis of the seal area.

The first and second inlet axes may each be inclined at an acute angle relative to the central axis of the seal area. The first cooling holes formed in the guide plate may be arranged along at least two circumferential lines, and the first inlet axis may be inclined at a different acute angle for the first cooling holes of the respective circumferential lines.

The guide plate may be integrally formed with the flow sleeve.

The first cooling holes may be spaced apart at regular intervals along a first circumferential line lying on the guide plate upstream of the central axis, while passing through the guide plate along the first inlet axis; and the second cooling holes may be spaced apart at regular intervals along a second circumferential line lying on the guide plate downstream of the central axis, while passing through the guide plate along the second inlet axis.

The first cooling holes may be arranged on the first circumferential line alternately with respect to the second cooling holes arranged on the second circumferential line in a circumferential direction of the duct assembly.

The seal area may extend between the first and second circumferential lines.

According to another aspect of the present invention, there is provided a combustor of a gas turbine. The combustor may include a duct assembly having the above cooling path structure to cool the duct assembly heated by hot combustion gas and having a double-wall structure in which a flow sleeve surrounds a liner and a transition piece connected by a ring-type elastic support.

According to the present invention, the provision of the cooling path structure in the duct assembly of a gas turbine combustor has an effect of inducing an impact of the compressed air on the seal area of the duct assembly, which is vulnerable to heat, thereby concentrating the cooling effect of the seal area.

Further, the provision of the cooling path structure in the duct assembly of a gas turbine combustor has an effect of removing destructive factors due to a pressure drop and a reduction in a flow rate of the compressed air flowing around the seal area of the duct assembly, thereby improving the efficiency of cooling the seal area.

The effects of the invention are not limited to the above effects, and other effects will be apparent to those skilled in the art from the flowing description.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
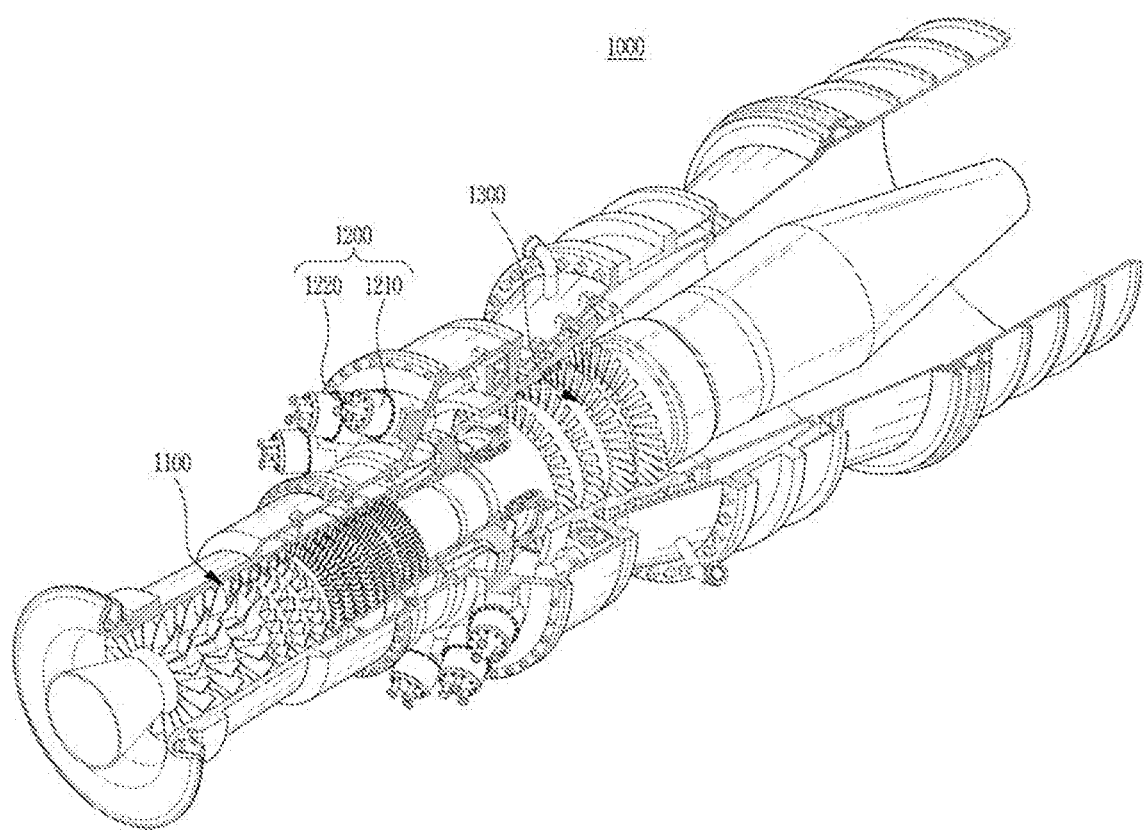
FIG. 1 is a cutaway perspective view of an entire structure of a gas turbine.

Preferred embodiments of the present invention will now be described in detail with reference to the accompanying drawings.

In the following description, it is to be noted that, when the functions of conventional elements and the detailed description of elements related with the present invention may make the gist of the present invention unclear, a detailed description of those elements will be omitted. Wherever possible, the same reference numerals will be used throughout the drawings and the description to refer to the same or like parts. When referring to the drawings, it should be understood that the shape and size of the elements shown in the drawings may be exaggeratedly drawn to provide an easily understood description of the structure of the present invention.

It should be understood that, although the terms first and second, A and B, (a) and (b), etc. may be used herein to describe various elements of embodiments of the present invention, the terms are only used to distinguish one element from another element, and thus do not limit a feature, order, etc. of the element. In addition, it should be understood that terms concerning attachments, coupling and the like, such as "connected" and "coupled" refer to a relationship wherein structures are secured or attached to one another either directly or indirectly through intervening structures.

An ideal thermodynamic cycle of a gas turbine follows a Brayton cycle. The Brayton cycle consists of four thermodynamic processes: an isentropic compression (adiabatic compression), an isobaric combustion, an isentropic expansion (adiabatic expansion), and isobaric heat rejection. That is, in the Brayton cycle, atmospheric air is sucked and compressed into high pressure air, a mixture of fuel and compressed air is combusted at constant pressure to discharge heat energy, heat energy of hot expanded combustion gas is converted into kinetic energy, and exhaust gases containing remaining heat energy is discharged to the outside. That is, gases undergo four thermodynamic processes: compression, heating, expansion, and heat ejection.

A gas turbine for realizing the Brayton cycle includes a compressor, a combustor, and a turbine. FIG. 1 illustrates an overall construction of a gas turbine 1000. Although the present invention will be described with reference to FIG. 1, the present invention may be widely applied to similar turbine engines other than the gas turbine 1000 shown in FIG. 1.

The compressor 1100 of the gas turbine 1000 sucks and compresses air. The compressor mainly serves both to supply the compressed air for combustion to a combustor 1200 and to supply the compressed air for cooling to a high temperature region of the gas turbine 1000. Since the sucked air undergoes an adiabatic compression process in the compressor 1100, the air passing through the compressor 1100 has increased pressure and temperature. The compressor 1100 in such a large-scale gas turbine 1000 as shown in FIG. 1 is a multi-stage axial compressor that compresses a great amount of air to a target compression ratio through multiple stages.

Figure 2:
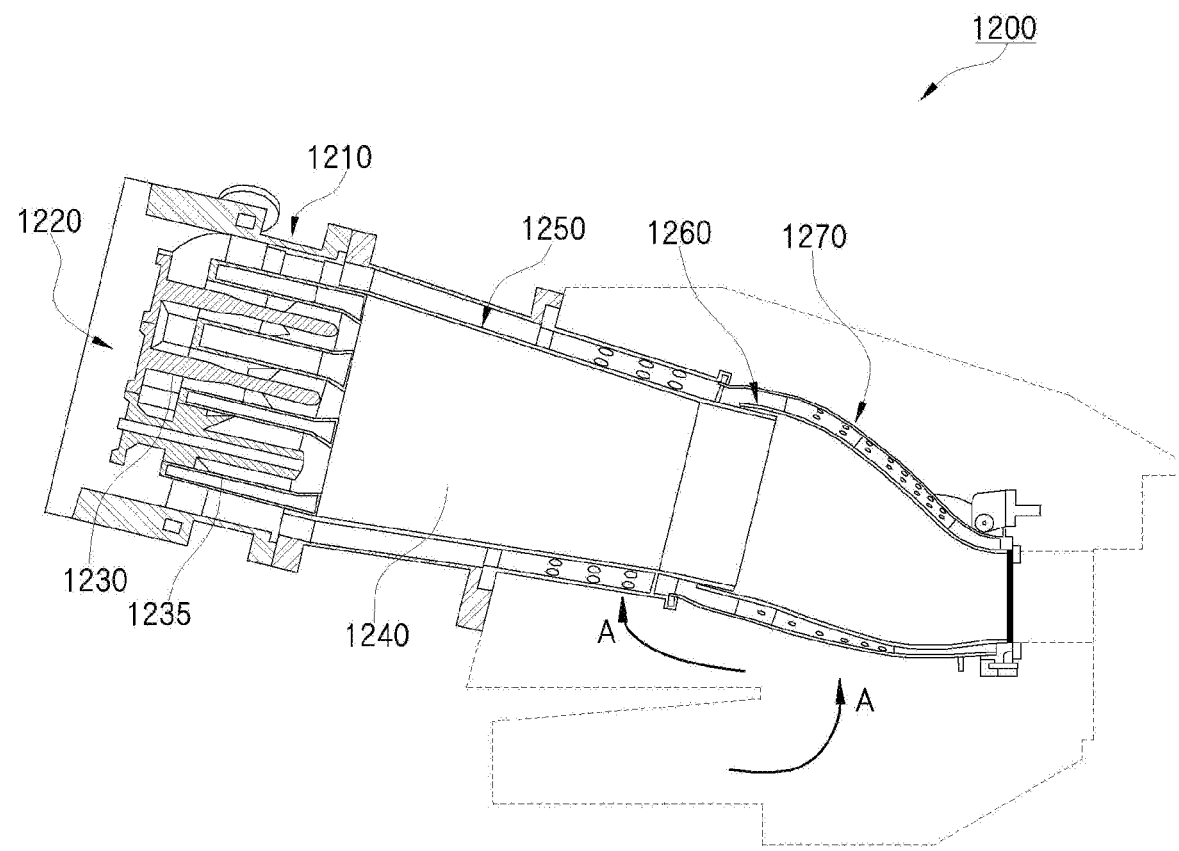
FIG. 2 is a cross-sectional view of a gas turbine combustor, into which compressed air is being introduced for cooling.

The combustor 1200 mixes the compressed air supplied from an outlet of the compressor 1100 with fuel and combusts the mixture at constant pressure to produce hot combustion gases. FIG. 2 illustrates an example of the combustor 1200 provided in the gas turbine 1000. The combustor 1200 is disposed downstream of the compressor 1100 and a plurality of burners 1220 is disposed along an inner circumference of a combustor casing 1210. The burners 1220 each have several combustion nozzles 1230, through which fuel is sprayed into and mixed with air in a proper ratio to form a fuel-air mixture suitable for combustion.

The gas turbine 1000 may use gas fuel, liquid fuel, or a combination thereof. In order to create a combustion environment for reducing emissions such as carbon monoxides, nitrogen oxides, etc. as a target of regulation, a gas turbine has a recent tendency to apply premixed combustion that is advantageous in reducing emissions through lowered combustion temperature and homogeneous combustion despite its relatively difficult combustion control.

In premixed combustion, after compressed air is previously mixed with fuel sprayed from the combustion nozzles 1230, the mixture is supplied to a combustion chamber 1240. When the premixed gas is initially ignited by an ignitor and then the combustion state is stabilized, the combustion state is maintained by supplying fuel and air.

Since the combustor 1200 is the highest-temperature environment in the gas turbine 1000, the combustor needs suitable cooling. Particularly, turbine inlet temperature (TIT) is an important factor in the gas turbine 1000, since the higher TIT is, the greater the operating efficiency of the gas turbine 100 is. Further, as TIT increases, it is advantageous to gas-turbine combined power generation. Thus, TIT is also used as a reference to determine classes (grades) of a gas turbine 1000.

Since temperature of combustion gas should be increased in order to increase TIT, it is important to design the combustion chamber 1240 and a duct assembly having a cooling path both to have high heat resistance and to be easily cooled.

Referring to FIG. 2, the duct assembly includes a liner 1250, the transition piece 1260, and the flow sleeve 1270 and is provided to connect the turbine 1300 and a section of combustor 1200 occupied by the burners 1220, such that the duct assembly heated by hot combustion gas is properly cooled while the hot combustion gas flows towards the combustion nozzles 1230 along an outer surface of the duct assembly.

The duct assembly has a double-wall structure in which the flow sleeve 1270 surrounds the liner 1250 and the transition piece 1260, which are connected by means of an elastic support 1280 (FIG. 3), wherein compressed air is introduced into an inner annular space of the flow sleeve 1270 to cool the liner 1250 and the transition piece 1260.

The liner 1250 is a tube member connected to the burner section of the combustor 1200, wherein an internal space of the liner 1250 defines the combustion chamber 1240. The transition piece 1260, which is connected to the liner 1250, is connected to an inlet of the turbine 1300 to guide the hot combustion gas towards the turbine 1300. The flow sleeve 1270 serves both to protect the liner 1250 and the transition piece 1260 and to prevent high temperature heat from being discharged directly to the outside.

Particularly, since the liner 1250 and the transition piece 1260 come into direct contact with the hot combustion gas, they should be properly cooled. To this end, the liner 1250 and the transition piece 1260 are protected from the hot combustion gas through a film-cooling method using the compressed air. For example, as illustrated in FIG. 2, for effective film-cooling, a complex double-wall structure may also be employed in order to introduce the compressed air directly to inner circumferential surfaces of the liner 1250 and the transition piece 1260.

Since front and rear ends of the liner 1250 and the transition piece 1260 are fastened to the combustor 1200 and turbine 1300 sides, respectively, the elastic support 1280 needs to support the liner 1250 and the transition piece 1260 with a structure capable of accommodating longitudinal and radial extension due to heat expansion.

High temperature, high pressure combustion gas generated by the combustor 1200 is supplied to the turbine 1300 through the duct assembly. In the turbine 1300, the combustion gas undergoes adiabatic expansion and impacts and drives a plurality of blades arranged radially around a rotary shaft so that heat energy of the combustion gas is converted into mechanical energy with which the rotary shaft rotates. A portion of the mechanical energy obtained from the turbine 1300 is supplied as the energy required to compress the air in the compressor, and the rest is utilized as an available energy to drive a generator to produce electric power.

Since the gas turbine 1000 has no major components such as mutually frictional parts and thus does not perform a reciprocating motion, the gas turbine has advantages in that lubricant consumption is very low, amplitude of a driving motion in the gas turbine is reduced, and high speed motion is possible.

Since heat efficiency in the Brayton cycle increases as compression ratio of air increases and TIT (turbine inlet temperature) of the combustion gas introduced during isoentropic expansion increases, the gas turbine 1000 is being directed to an increase in the compression ratio and TIT.

Reference will now be made in detail to the cooling path structure for concentrated cooling of seal parts in the combustor 1200 of the gas turbine 1000, with reference to FIGS. 2 to 8.

Figure 3:
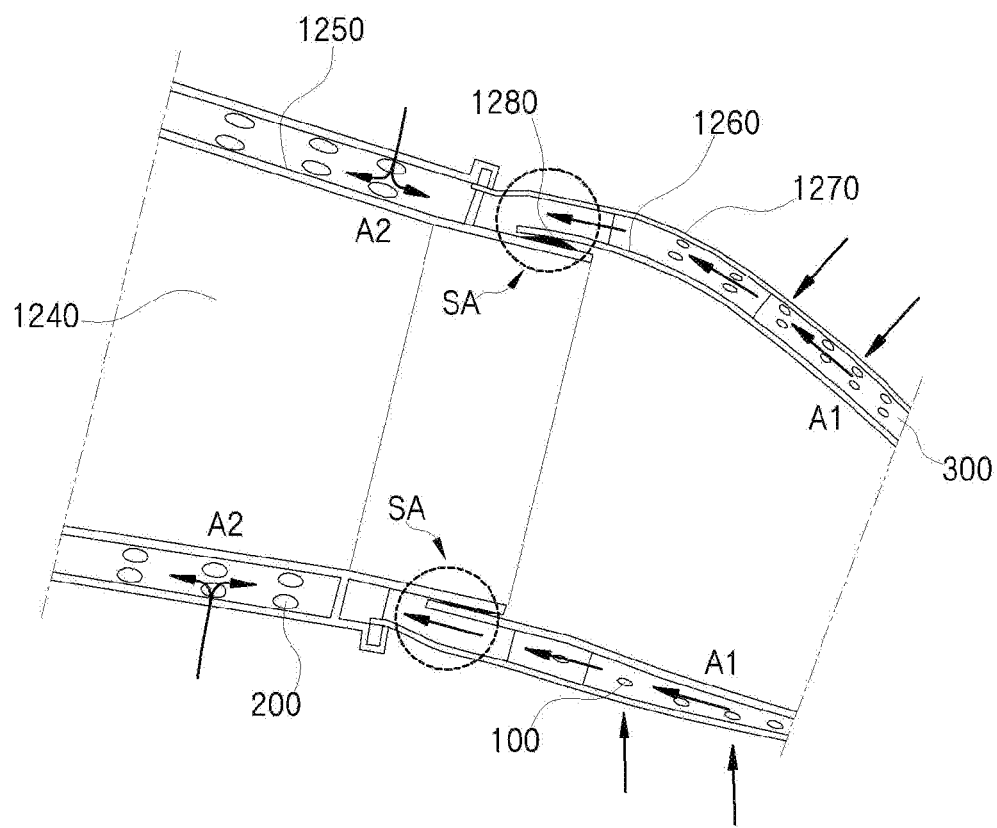
FIG. 3 is a cross-sectional view for illustrating a flow of compressed cooling air through a typical double-wall cooling path structure of a duct assembly in the combustor.

FIG. 2 illustrates an inflow of compressed cooling air A into the combustor 1200 of the gas turbine, and FIG. 3 illustrates a flow of compressed cooling air A1 and A2 through a typical double-wall cooling path structure of a duct assembly in the combustor 1200.

As described before, referring to FIGS. 2 and 3, the duct assembly has a double-wall structure in which the flow sleeve 1270 surrounds the liner 1250 and the transition piece 1260, which are connected by means of the elastic support 1280. The elastic support 1280 may be formed of a metallic material, such as that of a hula seal in an embodiment, to support the liner 1250 and the transition piece 1260 with a structure capable of accommodating longitudinal and radial extension due to heat expansion.

In the present invention, a seal area SA is an area including the elastic support 1280 and a partial area of each of the liner 1250 and the transition piece 1260 supported by the elastic support 1280 so that the partial areas are affected by a structural impact by the elastic support. Thus, the seal area SA, which is in immediate proximity to the elastic support 1280, includes the partial areas relative to rear and front sides of the liner 1250 and the transition piece 1260. In other words, the seal area SA may include areas surrounding the ring-type elastic support 1280 to include rear and front sections of the liner 1250 and the transition piece 1260 in proximity to the elastic support.

In a conventional cooling path structure concerning the seal area SA, a portion of compressed air A discharged from the compressor 1100 of the gas turbine 1000 approaches the flow sleeve 1270 radially from a central shaft (rotor shaft) (i.e., upward from the bottom side in FIG. 2) in order to cool the duct assembly, particularly the transition piece 1260, which is heated by hot combustion gas. Such compressed air A is introduced into and flows through a space 400 in the double-wall structure of the duct assembly through cooling holes formed in an outer surface of the flow sleeve 1270 so as to cool the hot transition piece 1270 and the liner 1250 according to the cooling path structure (see flows A1 and A2 in FIG. 3).

However, the seal areas SA positioned at the rear and front ends of the liner 1250 and the transition piece 1260 is not subjected to sufficient cooling, since the compressed air A1 is introduced into the space of the double-wall structure through the cooling holes 100 of the flow sleeve 1270 in proximity to a middle or rear portion of the transition piece 1260 and simply flows upstream past the seal area.

Further, according to the conventional cooling path structure, the efficiency of cooling of the seal area SA is further degraded, since the compressed air A2 introduced into the space 300 of the double-wall structure through the cooling holes 200 of the flow sleeve 1270 in proximity to the liner 1250 offsets the pressure of the compressed air A1 flowing upstream along the space 300 while flowing downstream along the space 300.

Thus, in order to implement concentrated cooling of a seal area SA in a duct assembly of a gas turbine compressor, according to the present invention, a cooling path structure applied to a guide plate 10 for concentrated cooling, which faces the seal area SA, and the flow sleeve 1270 including the guide plate is provided. The cooling path structure will be described in detail as follows.

Figure 4:
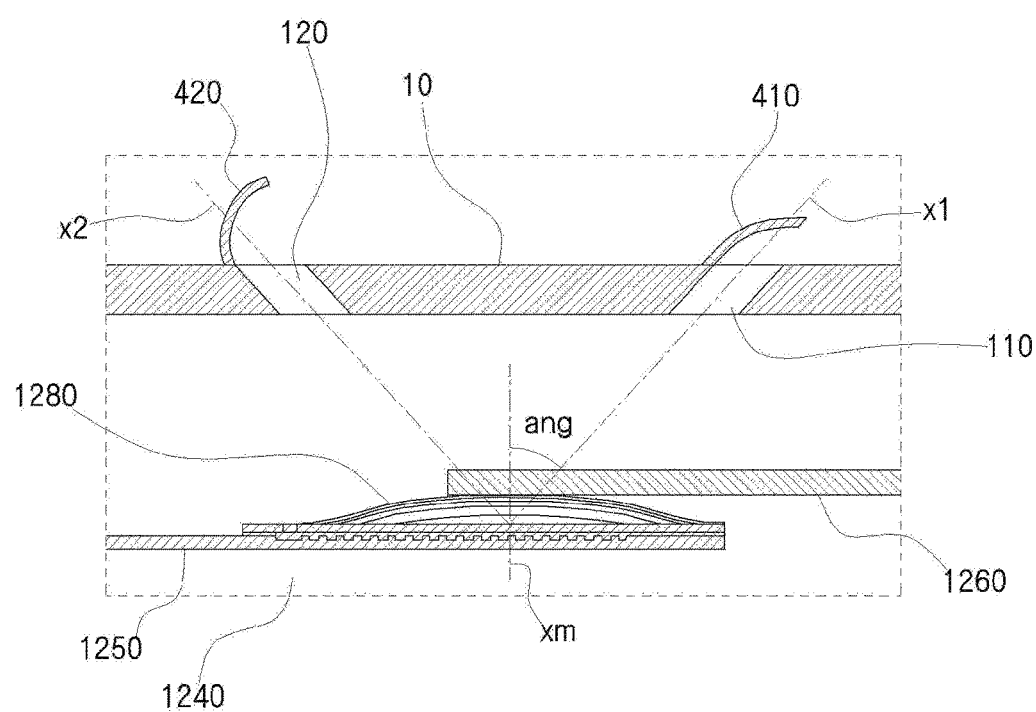
FIG. 4 is a cross-sectional view of a duct assembly employing a cooling path structure for concentrated cooling of a seal area according to an embodiment of the present invention.
Figure 5A:
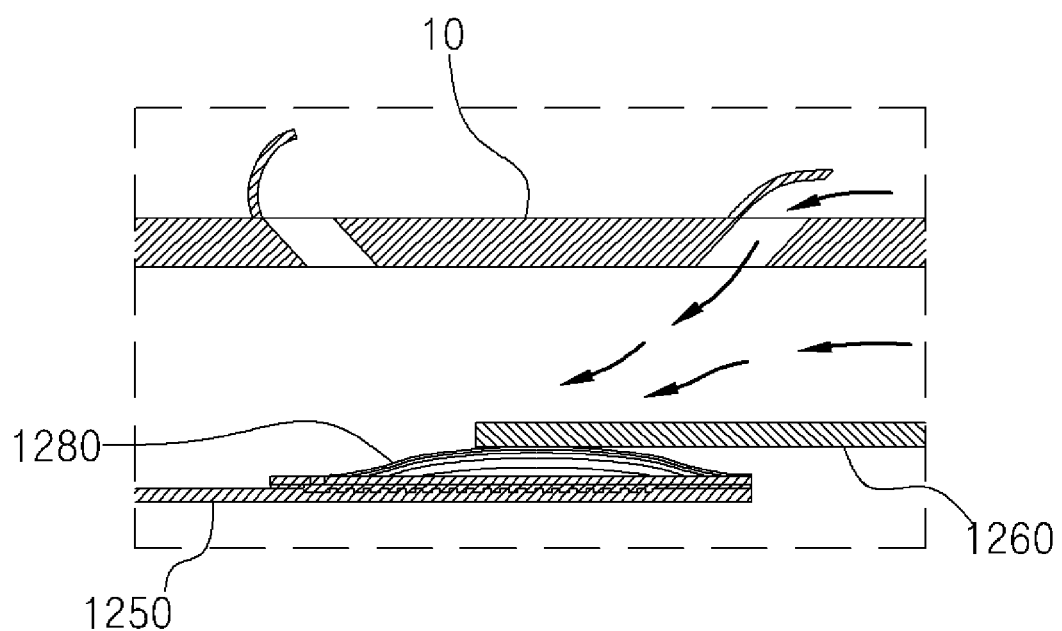
FIGS. 5A and 5B are cross-sectional views for illustrating the concentrated cooling effect of the seal area using the cooling path structure according to the embodiment of the present invention.
Figure 5B:
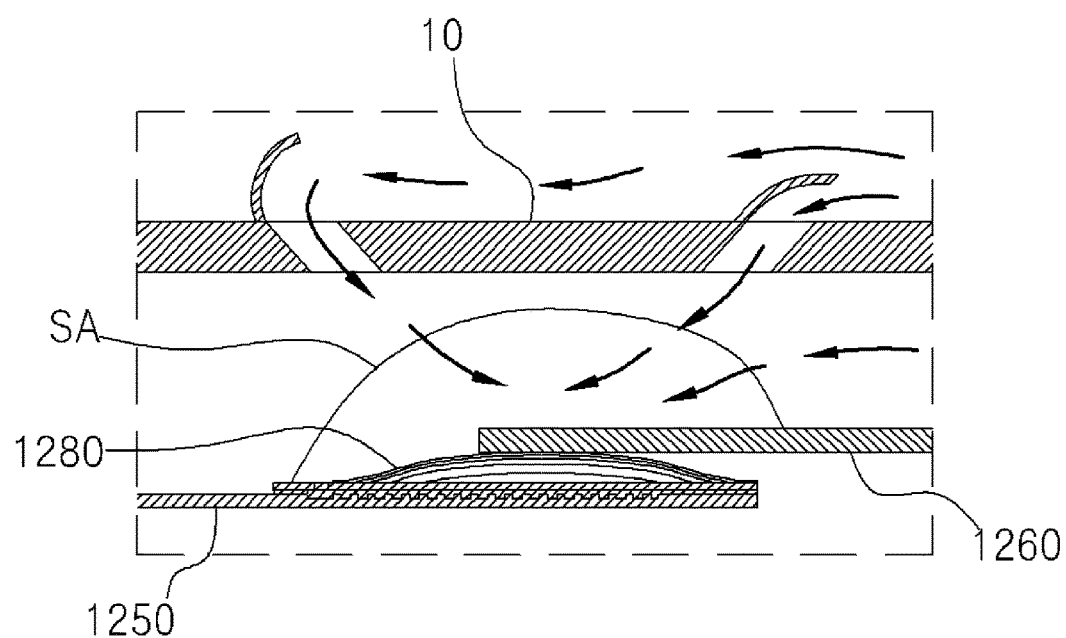

FIG. 4 shows a duct assembly employing a cooling path structure for concentrated cooling of a seal area according to an embodiment of the present invention. FIGS. 5A and 5B show the concentrated cooling effect of the seal area using the cooling path structure for cooling of the seal area.

Referring to FIGS. 4 and 5, a guide plate 10 for concentrated cooling (hereinafter a guide plate) facing the seal area SA is provided with first cooling holes 110 and second cooling holes 120, which are separated in an axial direction of the combustor 1200 or the transition piece 1270.

The first cooling holes 110 are spaced apart at regular intervals along a first circumferential line, which lies on the guide plate 10 behind a central axis xm of the seal area SA (or upstream, in a direction of a flow of the compressed air), while passing through the guide plate 10 along a first inlet axis x1 inclined towards the central axis xm of the seal area SA, so that the compressed cooling air can be introduced in a forward direction towards the seal area SA (see FIG. 5A).

Further, the second cooling holes 120 are spaced apart at regular intervals along a second circumferential line, which lies on the guide plate 10 in front of the central axis xm of the seal area SA (or downstream, in a direction of a flow of the compressed air), while passing through the guide plate 10 along a second inlet axis x2 inclined towards the central axis xm of the seal area SA, so that the compressed cooling air can be introduced in a backward direction towards the seal area SA (see FIG. 5B).

As such, the guide plate 10 facing the seal area SA has, in tandem, first and second cooling holes 110 and 120, through which the compressed air is introduced to travel toward and impact the seal area SA in forward and backward directions simultaneously. Thus, the compressed air swirls around the seal area including the rear and front sides of the liner 1250 and the transition piece 1260, to which a seal (or an elastic support) is coupled, thereby maximizing the residence time of the compressed air around the seal area SA.

Further, the first and second inlet axes x1 and x2 are each inclined towards the central axis xm of the seal area SA, preferably in a symmetric form relative to the central axis xm of the seal area SA. Thus, forward and backward flows of the compressed air symmetrically collide with each other so that a destructive factor such as a pressure drop or the like is restricted from being applied to the compressed air flowing along the space 300 of the double-wall structure, thereby improving the efficiency of cooling of the seal area SA.

That is, the guide plate 10 has, on its front and rear sides, first and second cooling holes 110 and 120 inclined towards the central axis xm of the seal area, so that the forward and backward flows of the compressed air can collide with each other and so that the pressure drop of the compressed air introduced around the seal area in the forward and backward directions can be restricted as well.

Referring to FIGS. 4 and 5, a cooling hole guide 420 is provided around the second cooling hole 120 to increase a collected amount of the compressed air in preparation for a reduction in a flow rate of the compressed air flowing upstream through the space 300 of the double-wall structure, thereby ensuring a sufficient amount of a backward flow of the compressed air introduced for concentrated cooling of the seal area SA.

Further, a cooling hole guide 410 is also provided around the first cooling hole 110 to regulate an amount of a forward flow of the compressed air.

The cooling hole guides 410 and 420 may have any shape, so long as it is provided on the guide plate 10 to collect the compressed air A flowing upstream through the space 300 of the double-wall structure. For example, one or both of the cooling hole guides 410 and 420 may be configured as a spherical scoop, a bent or stepped part, or the like.

The cooling hole guide (410 or 420) as a spherical scoop may include a curved attachment around the perimeter of the cooling hole (110 or 120), a bent concave cover protruding from the curved attachment and having a predefined inlet diameter, and a collecting part provided in the cover, wherein the collecting part has an opening directed towards an introduction direction of the compressed cooling air. The cooling hole guide (410 or 420) as a stepped part may be provided only on a front edge of the cooling hole (110 or 120) and may protrude upwardly.

Further, the cooling hole guide 420 of the second cooling hole 120 may extend higher than the cooling hole guide 410 of the first cooling hole 110 from the guide plate 10. That is, since the compressed air A flowing upstream through the space 300 of the double-wall structure sequentially reaches the first cooling hole 110 and then the second cooling hole 120, the cooling hole guide 420 of the second cooling hole 120 is designed to have an inlet diameter larger than that of the cooling hole guide 410 of the first cooling hole 110, so that the cooling hole guide 420 of the second cooling hole 420 can collect a sufficient amount of compressed air. This contributes to homogeneous concentration of the compressed air A, a flow rate of which decreases as it flows upstream.

Figure 6:
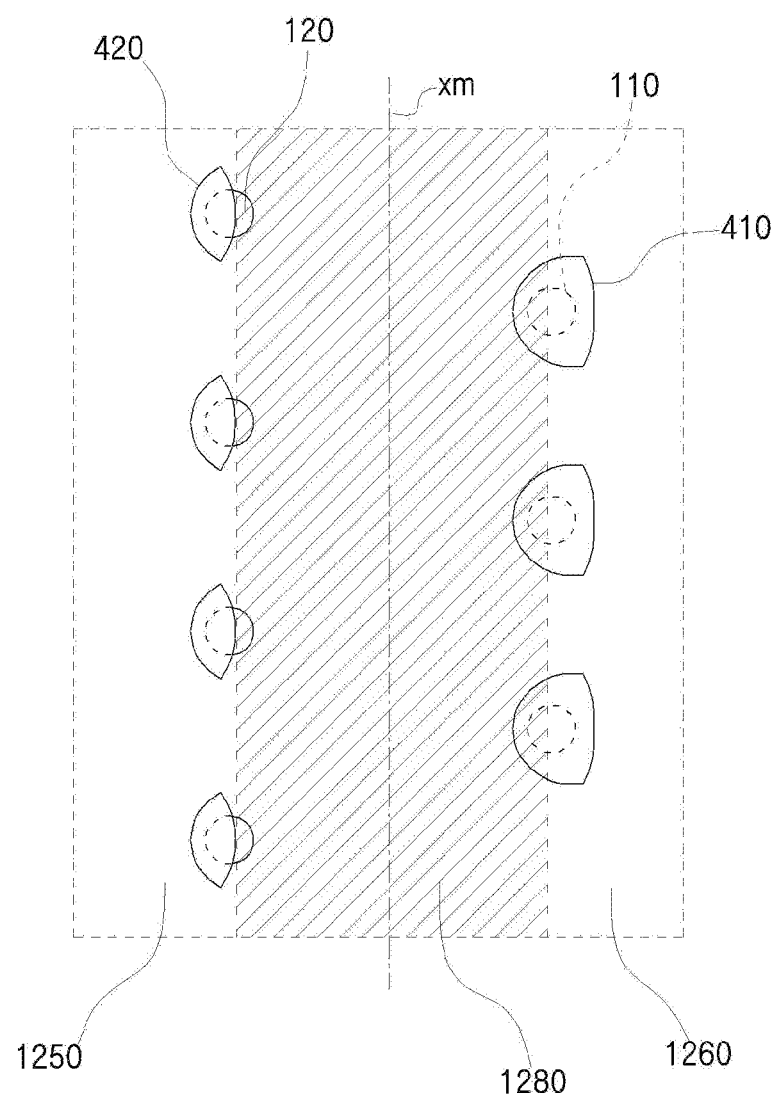
FIG. 6 is a schematic plan view for illustrating an arrangement of cooling holes in the cooling path structure according to the embodiment of the present invention.

FIG. 6 shows an arrangement of cooling holes in the cooling path structure for concentrated cooling of the seal area.

Referring to FIG. 6, the first cooling holes 110, which are circumferentially provided at regular intervals along the first circumferential line around the guide plate 10 behind the central axis xm of the seal area SA (right side in the drawing), and the second cooling holes 120, which are circumferentially provided at regular intervals along the second circumferential line around the guide plate 10 in front of the central axis xm of the seal area SA (left side in the drawing), may be arranged alternately in the circumferential direction.

This creates a circumferential swirl of the compressed air while preventing a pressure drop of the forward flow of the compressed air colliding with the backward flow of the compressed air, thereby effectively inducing a flow of the compressed air for concentrated cooling of the seal area SA. Further, the alternated arrangement of the first and second cooling holes 110 and 120 has an effect of separating a flow of the compressed air introduced into the first cooling holes 110 on the upstream side and a flow of the compressed air introduced into the second cooling holes 120 on the downstream side, contributing to homogeneous distribution of the compressed air introduced into the first and second cooling holes 110 and 120.

Figure 7:
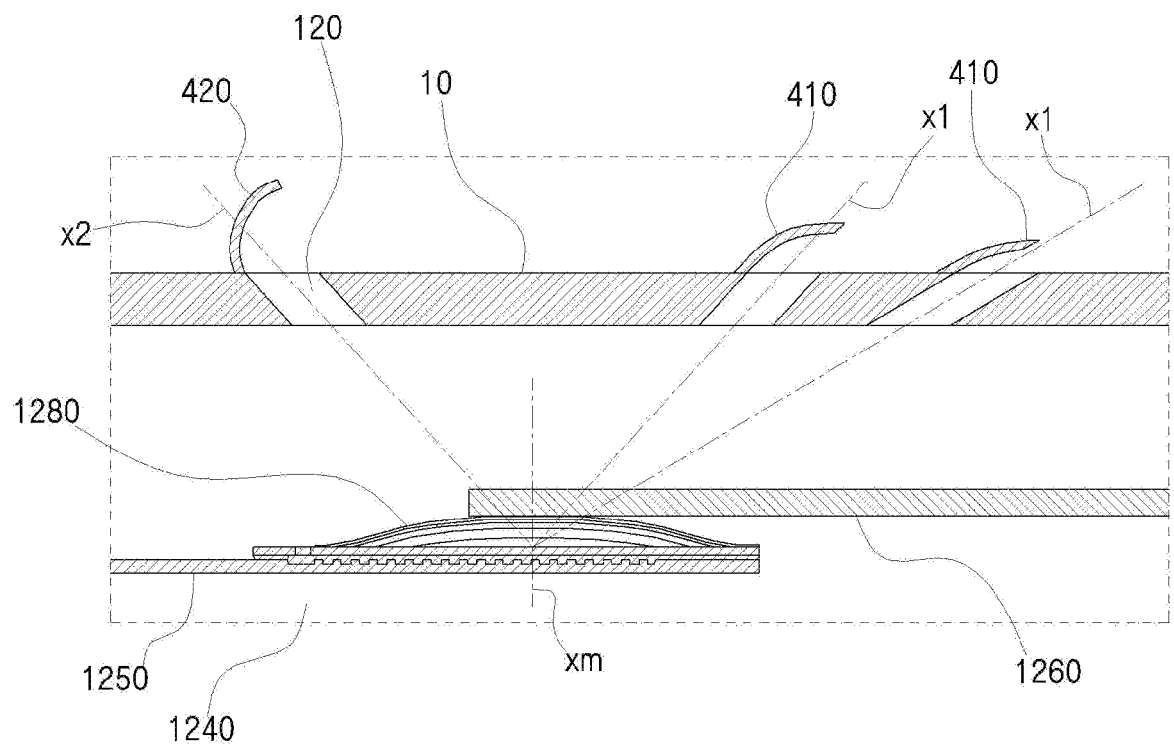
FIG. 7 is a cross-sectional view of a duct assembly employing a cooling path structure for concentrated cooling of a seal area according to another embodiment of the present invention.

FIG. 7 shows a duct assembly employing a cooling path structure for concentrated cooling of a seal area according to another embodiment of the present invention.

Referring to FIG. 7, the guide plate 10 has a plurality of first cooling holes 110 along at least two first circumferential lines, wherein the first cooling holes 110 along respective circumferential lines are inclined towards the central axis xm of the seal area SA along respective inlet axes x1 and x1' such that a forward flow of the compressed air is introduced towards the central axis xm of the seal area, wherein the respective inlet axes x1 and x1' have different acute angles relative to the central axis xm of the seal area.

In the embodiment shown in FIG. 7, the first cooling holes 110 are provided on the guide plate 10 behind the central axis xm of the seal area SA along two first circumferential lines, i.e., forward and rearward circumferential lines. The first cooling holes 110 along the forward and rearward circumferential lines are inclined at different acute angles relative to the central axis xm of the seal area SA, namely, along the inlet axes x1 and x1', wherein the acute angle of the inlet axis x1 relative to the central axis may be smaller than that of the inlet axis x1' relative to the central axis.

In the meantime, the guide plate 10 may have a plurality of second cooling holes 120 along at least two second circumferential lines (not shown). The second cooling holes 120 along respective circumferential lines are also inclined towards the central axis xm of the seal area SA along respective second inlet axes x2 such that a backward flow of compressed air is introduced towards the central axis xm of the seal area, wherein the respective inlet axes x2 have different acute angles relative to the central axis xm of the seal area. Here, the second cooling holes may be arranged in symmetric form with respect to the first cooling holes 110 relative to the central axis xm of the seal area.

In other words, the embodiment of FIG. 7 shows that the first cooling holes 110 and/or the second cooling holes 120 may be respectively provided along two or more circumferential lines. Here, as shown in the figure, cooling hole guides 410 and 420 provided along respective circumferential lines are designed to be higher (to have a large inlet diameter) as they are positioned forward (left side in the drawing), thereby ensuring homogeneous distribution of the compressed air introduced into the first/second cooling holes 110/120 on the downstream and upstream sides.

Figure 8:
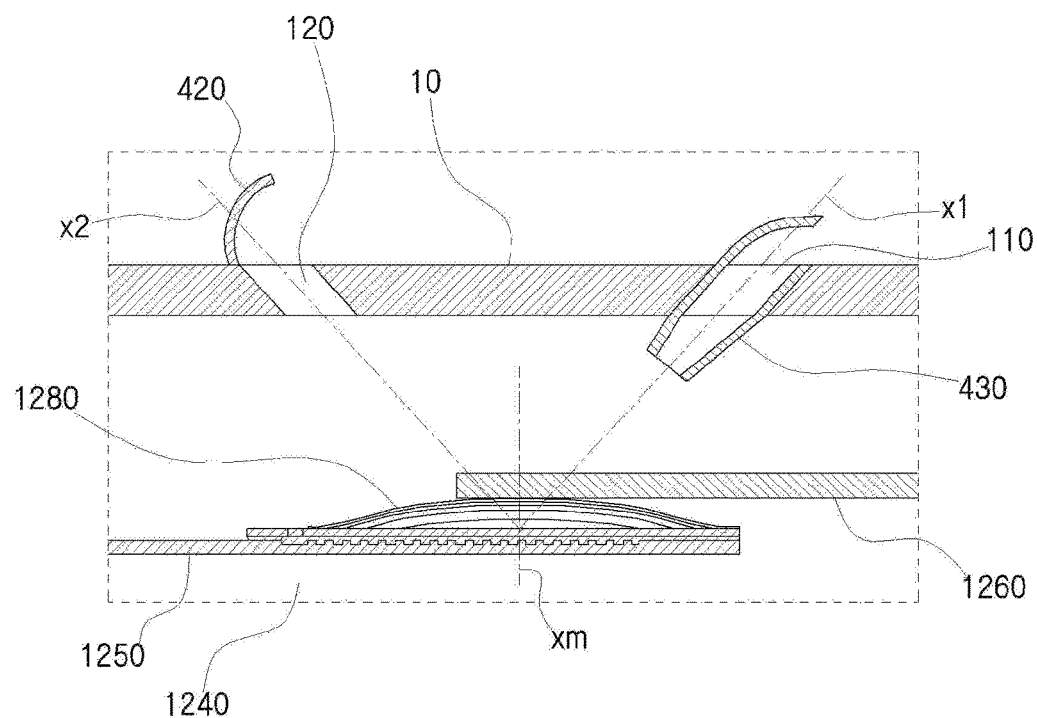
FIG. 8 is a cross-sectional view of a duct assembly employing a cooling path structure for concentrated cooling of a seal area according to a further embodiment of the present invention.

FIG. 8 shows a duct assembly employing a cooling path structure for concentrated cooling of a seal area according to a further embodiment of the present invention.

Referring to FIG. 8, the first cooling hole 110 may be provided with a guide tube 430 such that the guide tube 430 protrudes through the guide plate 10 and extends toward the seal area SA, allowing the compressed cooling air to be introduced more closely to the seal area SA. It is preferred that the guide tube 430 be provided only in the first cooling hole 110, which is inclined in a forward direction towards the central axis xm of the seal area SA, so as not to interfere with a flow of compressed air A flowing upstream through the space 300 of the double-wall structure.

Further, the guide tube 430 may have a gradually decreasing inner diameter towards the central axis xm of the seal area SA, so that a flow rate of the compressed air can gradually increase as it approaches the seal area SA.

The guide plate 10 may be circumferentially welded onto the flow sleeve 1270 such that cooling holes thereof are aligned with the cooling holes of the flow sleeve 1270, thereby being integrated with the flow sleeve.

According to the present invention, the provision of the cooling path structure in the duct assembly of a gas turbine combustor has an effect of inducing an impact of the compressed air on the seal area of the duct assembly, which is vulnerable to heat, thereby concentrating the cooling effect of the seal area.

Further, the provision of the cooling path structure in the duct assembly of a gas turbine combustor has an effect of removing destructive factors due to a pressure drop and a reduction in a flow rate of the compressed air flowing around the seal area of the duct assembly, thereby improving the efficiency of cooling of the seal area.

In the foregoing, the cooling path structure for concentrated cooling of the seal area and an improvement of cooling performance of the transition piece, and the gas turbine combustor including the same have been described. It will be understood that those skilled in the art can implement the technical configurations of the invention into other specific forms without changing the technical scope or essential features of the invention.

Therefore, the above-mentioned embodiments are provided for illustrative purposes in all aspects and should not be construed as limiting the invention.

What is claimed is:

1. A cooling path structure for concentrated cooling of a seal area in a duct assembly of a gas turbine combustor, the duct assembly having a double-wall structure in which a flow sleeve surrounds a liner and a transition piece connected by a ring-type elastic support being positioned to be axially aligned with a central axis of the seal area relative to a longitudinal axis of the duct assembly, the central axis of the seal area extending radially through the ring-type elastic support, wherein the seal area includes a downstream end of the liner and an upstream end of the transition piece relative to combustion gas flow and exhibits symmetry about the central axis of the seal area by occupying a first circumferential area of the transition piece and a second circumferential area of the liner equal in axial length to that of the first circumferential area, and wherein the cooling path structure comprises:

an annular guide plate configured to introduce compressed cooling air into the seal area through a plurality of first cooling holes and a plurality of second cooling holes, the first plurality of cooling holes being disposed upstream of the central axis relative to a flow of the compressed cooling air between the flow sleeve and the liner and the transition piece and are arranged along a first circumferential line drawn around the annular guide plate, and the plurality of second cooling holes are disposed downstream of the central axis relative to the flow of the compressed cooling air between the flow sleeve and the liner and the transition piece and are arranged along a second circumferential line drawn around the annular guide plate, the first and second circumferential lines being symmetric relative to the central axis of the seal area; and a guide tube provided to at least one of the plurality of first cooling holes, the guide tube including a first portion protruding through the annular guide plate and a second portion that is disposed radially inward from an inside surface of the annular guide plate and extends from the first portion toward the seal area, wherein each of the plurality of first cooling holes is formed in the annular guide plate along a first inlet axis and is configured to direct the introduced cooling air to the seal area from an upstream side of the central axis relative to the flow of the compressed cooling air between the flow sleeve and the liner and the transition piece, and each of the plurality of second cooling holes is formed in the annular guide plate along a second inlet axis and is configured to direct the introduced cooling air to the seal area from a downstream side of the central axis relative to the flow of the compressed cooling air between the flow sleeve and the liner and the transition piece, the first and second inlet axes being symmetric relative to the central axis of the seal area.

2. The cooling path structure according to claim 1, wherein the guide plate faces the seal area and includes a first axial side and a second axial side disposed downstream of the first axial side, and the flow sleeve includes the first and second axial sides of the guide plate.

3. The cooling path structure according to claim 1, further comprising a first cooling hole guide protruding from the guide plate proximate to the first cooling holes.

4. The cooling path structure according to claim 1, further comprising a second cooling hole guide protruding from the guide plate proximate to the second cooling holes.

5. The cooling path structure according to claim 1, further comprising first and second cooling hole guides protruding from the guide plate proximate to the first and second cooling holes, respectively, wherein the second cooling hole guide protrudes higher than the first cooling hole guide.

6. The cooling path structure according to claim 1, wherein the first portion has a constant inner diameter and the second portion of the guide tube has a decreasing inner diameter towards the central axis of the seal area.

7. The cooling path structure according to claim 1, wherein the first and second inlet axes each are inclined at an acute angle relative to the central axis of the seal area.

8. The cooling path structure according to claim 7, wherein the annular guide plate is further configured to introduce compressed cooling air into the seal area through a third plurality of cooling holes arranged along a third circumferential line on the guide and disposed on the same side of the central axis of the seal area as the first cooling holes, the third plurality of cooling holes formed in the annular guide plate along a third inlet axis having an angle different than the first inlet axis.

9. The cooling path structure according to claim 2, wherein the guide plate is integrally formed with the flow sleeve by circumferentially welding each of the first and second axial sides of the guide plate to the flow sleeve such that the first and second cooling holes are axially aligned with cooling holes of the flow sleeve.

10. The cooling path structure according to claim 1,
wherein the first cooling holes are spaced apart at regular intervals along the first circumferential line, while passing through the guide plate along the first inlet axis; and
wherein the second cooling holes are spaced apart at regular intervals along the second circumferential line, while passing through the guide plate along the second inlet axis.

11. The cooling path structure according to claim 1,
wherein the first cooling holes are arranged on the first circumferential line so as to be alternately disposed with respect to the second cooling holes arranged on the second circumferential line in a circumferential direction of the duct assembly, and
wherein the first cooling holes and the second cooling holes are arranged to be circumferentially offset relative to each other along the circumferential direction of the duct assembly, such that a flow of the compressed air introduced into the first cooling holes on the upstream side and a flow of the compressed air introduced into the second cooling holes on the downstream side are separated from each other.

12. The cooling path structure according to claim 1, wherein the seal area extends between the first and second circumferential lines.

13. A combustor of a gas turbine, the combustor comprising:
a duct assembly having a cooling path structure for concentrated cooling of a seal area in the duct assembly heated by hot combustion gas and having a double-wall structure in which a flow sleeve surrounds a liner and a transition piece connected by a ring-type elastic support being positioned to be axially aligned with a central axis of the seal area relative to a longitudinal axis of the duct assembly, the central axis of the seal area extending radially through the ring-type elastic support,
wherein the seal area includes a downstream end of the liner and an upstream end of the transition piece relative to combustion gas flow and exhibits symmetry about the central axis of the seal area by occupying a first circumferential area of the transition piece and a second circumferential area of the liner equal in axial length to that of the first circumferential area, and
the cooling path structure including:
an annular guide plate configured to introduce compressed cooling air into the seal area through a plurality of first cooling holes and a plurality of second cooling holes, the plurality of first cooling holes being disposed upstream of the central axis relative to a flow of the compressed cooling air between the flow sleeve and the liner and the transition piece and are arranged along a first circumferential line drawn around the annular guide plate, and the plurality of second cooling holes are disposed downstream of the central axis relative to the flow of the compressed cooling air between the flow sleeve and the liner and the transition piece and are arranged along a second circumferential line drawn around the annular guide plate, the first and second circumferential lines being symmetric relative to the central axis of the seal area; and
a guide tube provided to at least one of the plurality of first cooling holes, the guide tube including a first portion protruding through the annular guide plate and a second portion that is disposed radially inward from an inside surface of the annular guide plate and extends from the first portion toward the seal area,
wherein each of the plurality of first cooling holes is formed in the annular guide plate along a first inlet axis and is configured to direct the introduced cooling air to the seal area from an upstream side of the central axis relative to the flow of the compressed cooling air between the flow sleeve and the liner and the transition piece, and each of the plurality of second cooling holes is formed in the annular guide plate along a second inlet axis and is configured to direct the introduced cooling air to the seal area from a downstream side of the central axis relative to the flow of the compressed cooling air between the flow sleeve and the liner and the transition piece, the first and second inlet axes being symmetric relative to the central axis of the seal area.

* * * * *